United States Patent Office 2,962,354
Patented Nov. 29, 1960

2,962,354

METHOD FOR PRODUCING CONDENSED PHOSPHATE SALTS

James W. Edwards, Dayton, Ohio, assignor to Monsanto Chemical Company, St. Louis, Mo., a corporation of Delaware No Drawing. Filed June 27, 1957, Ser. No. 668,320

4 Claims. (Cl. 23—106)

This invention relates to improved processes for producing condensed phosphates. More specifically, this invention relates to improvements in certain phosphate condensation processes which are carried out at a temperature below the melting point of the condensed phosphate product.

Condensed phosphates can be prepared in numerous ways. One of the most common ways, especially for commercial production, involves the calcination (and consequent molecular dehydration) of a phosphate or mixture of phosphates having the same atomic ratio of metal to phosphorus but a lower degree of condensation than the desired condensed phosphate product. Such processes are carried out by what is generally considered to be a solid-state reaction, since at no time during the reaction does the reaction temperature rise above the melting point of the condensed phosphate product. Examples of such solid-state condensation reactions are as follows:

$$2NaH_2PO_4 \xrightarrow{200°\ C.} Na_2H_2P_2O_7 + H_2O$$

$$2Na_2HPO_4 \xrightarrow{200°\ C.} Na_4P_2O_7 + H_2O$$

$$2CaHPO_4 \xrightarrow{600°\ C.} Ca_2P_2O_7 + H_2O$$

$$NaH_2PO_4 \xrightarrow{325°\ C.} NaPO_3-II + H_2O$$

$$NaH_2PO_4 \xrightarrow{450°\ C.} NaPO_3-I + H_2O$$

$$KH_2PO_4 \xrightarrow{250°\ C.} KPO_3 + H_2O$$

$$Na_2HPO_4 \cdot 2H_2O + NaH_2PO_4 \cdot Na_2HPO_4 \xrightarrow{400°\ C.} Na_5P_3O_{10} + 3H_2O$$

For purposes of identification or description, phosphates can be represented stoichiometrically as combinations of cationic oxides (such as $Na_2O$, $H_2O$ of composition, $(NH_3)_2O$, $CaO$, $Al_{2/3}O$, $Ti_{1/2}O$, $Ta_{2/5}O$, etc.) and the anionic oxide, $P_2O_5$. The ratio of cationic oxides to $P_2O_5$ determines the degree of condensation of the phosphate, the more highly condensed phosphates having a lower oxide ratio than the less highly condensed phosphates. Thus, for example, the metaphosphates (which are very highly condensed) have a cationic to anionic oxide ratio of 1, whereas the orthophosphates (which are uncondensed) have an oxide ratio of 3. The production of more highly condensed phosphates from less highly condensed phosphates involves driving off water of composition (as distinguished from water of hydration) from the less highly condensed phosphates while leaving the molar ratio of other cationic oxides to phosphorus pentoxide fixed.

It has now been found that in some of the foregoing solid-state phosphate condensation reactions, the reactants pass through an intermediate plastic or amorphous phase prior to formation of the final condensed phosphate product. The formation of the intermediate amorphous phase is not a simple matter whereby all of the reactants are first converted to an amorphous phase and then the amorphous phase is converted to the ultimate product. On the contrary, the various stages generally occur simultaneously—so that at any particular instant there may be present only such a minor concentration of amorphous phase that it would be undetectable by the naked eye. The presence of amorphous material at any particular stage of the reaction can be detected, however, by chilling the reaction mass (to arrest reaction at the particular stage in question) and subjecting it to X-ray diffraction analysis or examining it under a polarizing optical microscope.

The present invention involves the further discovery that when a process of the above description (i.e., a solid-state phosphate condensation process involving an intermediate formation of an amorphous phase) is utilized to produce a phosphate more highly condensed than the linear or chain triphosphates (i.e., having a cationic oxide to $P_2O_5$ ratio of 5/3), the process can be carried out much more advantageously by adding some of the desired condensed phosphate product to the less highly condensed phosphate reactants prior to the molecular dehydration of such reactants. The advantages of the present improvement may be manifested in one or more of various ways, such as by greater yields of desired product, accelerated rates of reaction, greater degree of freedom in selection of reaction conditions, etc.

It should be noted that some of the condensed phosphates involved in the present invention have two or more forms. For example, sodium metaphosphate is known to exist in at least six crystalline forms, generally designated as $NaPO_3$—I, $NaPO_3$—I', $NaPO_3$—I'', $NaPO_3$—II, $NaPO_3$—III, and $NaPO_3$—IV. In some cases, the differences in forms of compounds having the same empirical formula involve differing molecular species. For example, $NaPO_3$—I is a cyclic compound containing a six-membered ring built up of alternate phosphorus and oxygen atoms, whereas $NaPO_3$—II (also known as Maddrell's salt) is a very long chain linear polyphosphate. On the other hand, the differences in forms may merely involve differences in crystalline modifications of the same molecular species. Such differences are found, for example, between $NaPO_3$—II and $NaPO_3$—III. For purposes of the present invention, the latter forms (i.e., those differing only with respect to crystalline modification) are considered equivalent to each other.

As will be noted from the various examples set forth below, the proportions of condensed phosphate product to be added to the phosphate reactants can be varied with considerable latitude, depending upon the particular condensation reaction involved, the desired magnitude of improvement required or desired, etc. It should also be readily apparent that the effectiveness of the additive will increase with the degree of subdivision of the additive and with the uniformity of distribution of the additive throughout the reaction mass. In general a minor proportion in excess of one-tenth or one-half percent by weight, and preferably in excess of about two percent by weight (based upon the total starting mixture) will be found desirable, although much larger proportions (e.g., as much as 20 percent, or even as much as 50% or higher) will sometimes be advantageous.

Further details and information with respect to the practice of the present invention can be obtained from the following examples of typical reactions carried out according to this invention.

*Example 1*

The conversion of anhydrous monosodium orthophosphate to insoluble metaphosphate ($NaPO_3$—II) with and without the initial addition of 5 percent by weight of $NaPO_3$—II, was studied by heating a series of samples for 2 hours at various different temperatures. It was found that at temperatures from about 300° to about 350° C., the anhydrous monosodium orthophosphate was converted to better than 90 percent insoluble metaphosphate, whether or not such metaphosphate was initially added to the monosodium orthophosphate. At 400° C. the orthophosphate having no metaphosphate originally added thereto was converted to more than 75 weight percent soluble metaphosphate ($NaPO_3$—I). At 425° C. and 450° C. the orthophosphate without metaphosphate addition was completely converted to soluble metaphosphate ($NaPO_3$—I). In contrast to these latter cases, the orthophosphate having 5 weight percent $NaPO_3$—II originally added thereto was converted to better than 90 percent insoluble metaphosphate at 400° C., and better than 50 percent insoluble metaphosphate at 450° C. Thus, it can be seen that by using a small percentage of insoluble metaphosphate ($NaPO_3$—II) in the original orthophosphate reactant, the conversion can be carried out at considerably higher temperatures and, of course, at a faster rate while still producing substantial amounts of the desired product, $NaPO_3$—II.

*Example 2*

The experimental procedure of Example 1 was repeated, except that monosodium orthophosphate monohydrate was utilized as the reactant instead of anhydrous monosodium orthophosphate. At temperatures from 300° to 350° C., it was found that the orthophosphate monohydrate was converted to better than 90 percent insoluble metaphosphate ($NaPO_3$—II) with or without addition of insoluble metaphosphate to the initial reactant. At 400° C. and at 425° C., the samples without initially added insoluble metaphosphate were converted to 75 percent and 90 percent, respectively, of soluble metaphosphate ($NaPO_3$—I). In contrast to these latter cases, samples initially containing 5 percent by weight of insoluble metaphosphate were converted to better than 90 percent by weight of insoluble metaphosphate at 400° and 425° C.

As in the preceding example, it will be seen that by seeding the initial reaction mixture with insoluble metaphosphate, there is considerably greater freedom in the selection of a conversion temperature to give a high yield of insoluble metaphosphate from the monosodium orthophosphate monohydrate.

*Example 3*

Two-tenths gram of powdered $LiPO_3$ and 1.8 grams of $LiH_2PO_4$ were thoroughly mixed together and heated in an open crucible for one and one-half hours at 255° C. At the same time, 2.0 grams of $LiH_2PO_4$ (with no $LiPO_3$ added) was heated under the same conditions. Subsequent analyses of the reaction products showed that the reaction mass originally containing ten percent of $LiPO_3$ had been converted to about 30 percent by weight $LiPO_3$, whereas the control sample (no $LiPO_3$ added) had not formed any $LiPO_3$.

*Example 4*

Two-tenths gram of powdered lead tetraphosphate, $Pb_3P_4O_{13}$ and 1.8 grams of a 1:2 molar mixture of mono lead orthophosphate, $Pb(H_2PO_4)_2$, and lead monohydrogen orthophosphate, $PbHPO_4$, were thoroughly mixed together and heated in an open crucible for 40 minutes at 335° C. At the same time, 2.0 grams of the 1:2 molar mixture of $Pb(H_2PO_4)_2$ and $PbHPO_4$ was heated under the same conditions. Subsequent analyses of the reaction products showed that the reaction mass originally containing 10 percent of $Pb_3P_4O_{13}$ had been converted to about 80 percent by weight of $Pb_3P_4O_{13}$, whereas the control sample had been less than 15 weight percent converted to $Pb_3P_4O_{13}$.

The foregoing discussion and examples have dealt primarily with condensations of compositions having the same molar ratio of metal oxide to phosphorus pentoxide in the initial reaction mixture as that of the desired product. However, the invention is not limited to the use of such reactant compositions, but can also be utilized to promote conversion to a product having a different molar ratio of metal oxide to phosphorus pentoxide than in the original reaction mixture. For example, the addition of a small amount of insoluble metaphosphate to an equimolar mixture of disodium orthophosphate and the double salt of monosodium orthophosphate and disodium orthophosphate will result in a greater yield of insoluble metaphosphate than would be formed if no insoluble metaphosphate were added to the initial reaction mixture.

This application is a continuation-in-part of my copending application, Serial No. 487,221, filed February 5, 1955, which has now been abandoned.

I claim:

1. In a method for producing $NaPO_3$—II by molecular dehydration of monosodium dihydrogen orthophosphate at an elevated temperature below the melting point of the $NaPO_3$—II, the improvement which comprises adding at least about 2 weight percent of solid crystalline $NaPO_3$—II to the monosodium dihydrogen orthophosphate prior to molecular dehydration thereof.

2. In the method for producing a desired crystalline condensed phosphate salt having a molar ratio of cationic oxide to $P_2O_5$ less than 5:3 from a phosphate reactant composition less highly condensed than the aforesaid desired condensed phosphate salt but having the same molar ratio of $P_2O_5$ to cationic oxide other than water by molecular dehydration of said reactant composition at an elevated temperature below the melting point of the aforesaid desired phosphate salt but with the intermediate formation of an amorphous phosphate phase, which method comprises adding at least 0.1 weight percent of the foregoing desired crystalline condensed phosphate to said reactant composition prior to molecular dehydration thereof, thereby improving the conversion of said reactant composition to the desired condensed phosphate salt.

3. A method for producing a metaphosphate salt from an orthophosphate composition containing an overall molar ratio of cationic oxide to $P_2O_5$ less than 5:3 by molecular dehydration of said orthophosphate composition at an elevated temperature below the melting point of said metaphosphate salt, which method comprises adding at least 0.1 weight percent of the foregoing solid crystalline metaphosphate salt to said orthophosphate composition prior to molecular dehydration thereof, thereby improving the conversion of said orthophosphate composition to the desired metaphosphate salt.

4. A method for producing sodium metaphosphate from an orthophosphate composition containing an overall molar ratio of $Na_2O:P_2O_5$ less than 5:3 by molecular dehydration of said orthophosphate composition at an elevated temperature below the melting point of said metaphosphate, which method comprises adding at least about 2 weight percent of solid crystalline sodium metaphosphate to said orthophosphate composition prior to molecular dehydration thereof, thereby improving the conversion of said orthophosphate composition to the desired sodium metaphosphate.

References Cited in the file of this patent

UNITED STATES PATENTS

| | | |
|---|---|---|
| 2,288,418 | Partridge | June 30, 1942 |
| 2,493,809 | Garrison | Jan. 10, 1950 |
| 2,737,443 | Wright | Mar. 6, 1956 |